United States Patent
Buchmann et al.

(10) Patent No.: US 10,622,913 B2
(45) Date of Patent: Apr. 14, 2020

(54) MODULAR MULTILEVEL CONVERTER CELL WITH INTEGRATED CURRENT SENSOR

(71) Applicant: ABB Schweiz AG, Baden (CH)

(72) Inventors: Beat Buchmann, Nussbaumen (CH); Simon Herold, Affoltern am Albis (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/306,224

(22) PCT Filed: Jun. 1, 2016

(86) PCT No.: PCT/EP2016/062354
§ 371 (c)(1),
(2) Date: Nov. 30, 2018

(87) PCT Pub. No.: WO2017/207045
PCT Pub. Date: Dec. 7, 2017

(65) Prior Publication Data
US 2019/0334453 A1  Oct. 31, 2019

(51) Int. Cl.
*H02M 7/483* (2007.01)
*H02M 1/32* (2007.01)
(Continued)

(52) U.S. Cl.
CPC .............. *H02M 7/483* (2013.01); *H02M 1/32* (2013.01); *H04B 10/2504* (2013.01);
(Continued)

(58) Field of Classification Search
CPC ......... H02M 7/483; H02M 2007/4835; H02M 1/32; H02M 2001/0009; H02M 7/493; H02J 3/1857
(Continued)

(56) References Cited

U.S. PATENT DOCUMENTS

| 6,014,323 A | 1/2000 | Aiello et al. |
| 2010/0019702 A1 | 1/2010 | Jang et al. |

(Continued)

FOREIGN PATENT DOCUMENTS

| EP | 2585304 A1 | 5/2013 |
| EP | 2830207 A2 | 1/2015 |

(Continued)

OTHER PUBLICATIONS

International Preliminary Report on Patentability Application No. PCT/EP2016/062354 Completed: May 11, 2018 6 Pages.
(Continued)

*Primary Examiner* — Alex Torres-Rivera
(74) *Attorney, Agent, or Firm* — Whitmyer IP Group LLC

(57) ABSTRACT

A modular cell for a phase leg of a Modular Multilevel power Converter (MMC) is disclosed. The cell includes a power storing device, a plurality of semiconductor switches, a cell controller, and a current sensor. The current sensor is connected between a current conducting line in the cell and the cell controller for measuring a current through the cell and signaling information about the measured current to the cell controller. The cell controller includes an optical communication interface and is configured for forwarding the information about the measured current to a higher level controller over the optical communication interface.

16 Claims, 2 Drawing Sheets

(51) Int. Cl.
*H04B 10/25* (2013.01)
*H02J 3/18* (2006.01)
*H02M 1/00* (2006.01)

(52) U.S. Cl.
CPC .... *H02J 3/1857* (2013.01); *H02M 2001/0009* (2013.01); *H02M 2007/4835* (2013.01)

(58) Field of Classification Search
USPC .......................................................... 363/72
See application file for complete search history.

(56) References Cited

U.S. PATENT DOCUMENTS

2012/0275202 A1* 11/2012 Yamamoto .............. H02M 1/32
363/71
2014/0210431 A1 7/2014 Rastogi et al.

FOREIGN PATENT DOCUMENTS

WO 2008067784 A1 6/2008
WO 2011107151 A1 9/2011

OTHER PUBLICATIONS

International Search Report & Written Opinion of the International Searching Authority Application No. PCT/EP2016/062354 Completed: Feb. 7, 2017; dated Feb. 15, 2017 11 Pages.

* cited by examiner

MODULAR MULTILEVEL CONVERTER CELL WITH INTEGRATED CURRENT SENSOR

TECHNICAL FIELD

The present disclosure relates to devices and methods for current measurements in a modular multilevel converter.

BACKGROUND

A Modular Multilevel power Converter (MMC), also known as Chain-Link Converter (CLC), comprises a plurality of converter cells, or converter sub-modules, serially connected in converter branches, or phase legs, that in turn may be arranged in a star, delta, direct or indirect converter topology. Each converter cell comprises, in the form of a half-bridge or full-bridge circuit, a capacitor for storing energy and power semiconductor switches such as insulated gate bipolar transistor (IGBT) devices, gate-turn-off thyristor (GTO) devices, integrated gate commutated thyristor (IGCT) devices, or Metal-Oxide-Semiconductor Field-Effect Transistor (MOSFET) devices for connecting the capacitor to the converter branch with one or two polarities. MMCs may be used in electric power transmission systems such as Static Synchronous Compensator (STATCOM), Frequency Converters in direct or indirect topology and High-Voltage Direct Current (HVDC) transmission.

For control and protection reasons, phase leg current measurements are mandatory in a converter. FIG. 1 illustrates a typical MMC in delta topology in which the phase leg between points 1 and 2 has a current i12 which is measured by a sensor (transducer) connected between the phase leg and a grounded input/output (I/O) board of a central control unit of the converter. If the converter is a high-voltage converter, a lot of insulation is needed for the sensor since the voltage difference between the phase and ground is high. The high-voltage converter may be located in a dedicated room or building, and the sensor and its insulation may be located in a wall bushing into said room or building.

Control functions can include:
Current control
Cell sorting and/or selection algorithms
Protection functions can include:
Overcurrent protection
Semiconductor thermal model Since MMC converters can be designed for high voltages (several 10 kV:s, e.g. U12=36 kVrms), current measurements can be expensive, or there may be no sensors available on the market due to the high insulation level. Insulation of the current transducer has to be designed for the voltage U0 of FIG. 1, which is in normal operation approximately U12/sqrt(3) or in failure cases (earth fault in the 3-phase system) even approximately U12.

An alternative, to reduce the insulation level, is to place a current sensor in each individual cell as an integrated part of the cell circuitry. The sensor may then be connected between a conducting line in each cell of the phase and the cell controller of the cell, each at high voltage potential, reducing the voltage difference which has to be handled by the insulation. However, since each cell of the phase leg has to know the present current, each cell has to be provided with its own current measurement sensor, which increases the cost of the converter.

US 2014/0210431 discloses a multi-cell power supply for receiving power from a source and delivering power at an output terminal to a load. The multi-cell power supply includes a first power cell coupled to the source, and a first current sensor circuit. The first power cell provides a first output current, and includes a first output terminal coupled to a reference node of the multi-cell power supply, and a second output terminal coupled to the output terminal. The first current sensor circuit includes a first current sensor and a power supply. The first current sensor is coupled to the first output terminal of the first power cell, and measures the first output current. The power supply is coupled to either the reference node or a floating ground node of the first power cell, and provides power to the first current sensor.

Thus, the current sensor circuit is outside the power cell but connected to the power cell to measure its output current. The current sensor circuit, as well as the power cell, may each have a fiber optic interface for communication with a central controller, whereby information about the measured current may be forwarded from the current sensor circuit to the power cell via the central controller.

SUMMARY

According to the present invention, problems with the prior art are solved by using a current sensor which is integrated in a cell of each phase of an MMC, the current sensor circuit thus being part of the cell module. However, in order to reduce cost and complexity of the converter, not all cells are provided with an integrated current sensor. Instead, information about measurements of the current performed by the sensor is signaled to a higher level controller over an optical interface between the central controller and a local cell controller of the cell module comprising the current sensor. This information may then be forwarded, possibly after processing by the central controller, to the other cell modules of the phase, thus ensuring that all cells in the phase has up-to-date information about the phase current. By means of the optical interface, the current sensor is insulated from the grounded higher level controller.

According to an aspect of the present invention, there is provided a modular cell for a phase leg of an MMC. The cell comprises a power storing device, a plurality of semiconductor switches, a cell controller, and a current sensor. The current sensor is connected between a current conducting line in the cell and the cell controller for measuring a current through the cell and signaling information about said measured current to the cell controller. The cell controller comprises an optical communication interface and is configured for forwarding the information about the measured current to a higher level controller over said optical communication interface.

According to another aspect of the present invention, there is provided an MMC, comprising at least one phase leg, each phase leg comprising a plurality of series connected cells, at least one, or a plurality, of said cells being in accordance with the modular cell aspect of the present disclosure.

According to another aspect of the present invention, there is provided a method performed by a cell controller comprised in a cell in a phase leg of an MMC. The method comprises receiving information from a current sensor, connected between a current conducting line in the cell and the cell controller. The information is about a measured current of the current conducting line. The method also comprises forwarding the received information to a higher level controller over an optical communication interface.

According to another aspect of the present invention, there is provided a computer program product comprising computer-executable components for causing a cell controller to perform the method of the present disclosure when the computer-executable components are run on processor circuitry comprised in the cell controller.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

When electric potential is mentioned herein, it is interchangeable with the voltage measured to ground.

Figure 1:
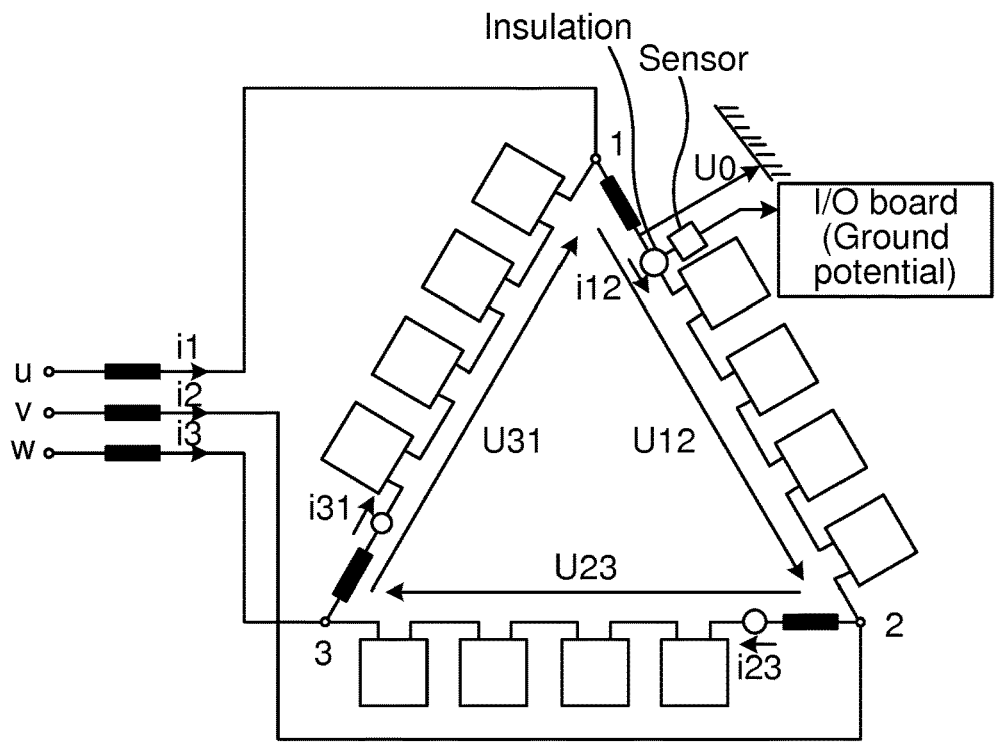
FIG. 1 is a schematic illustration of an embodiment of an MMC with current sensor, in accordance with prior art.
Figure 2:
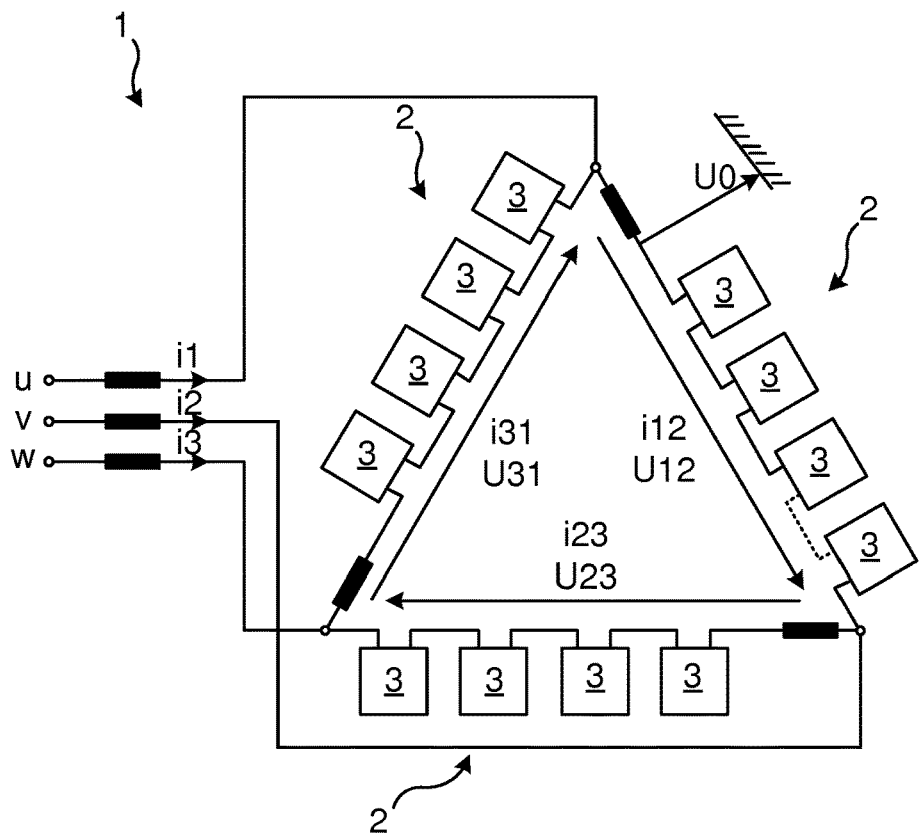
FIG. 2 is a schematic illustration of an embodiment of an MMC, in accordance with the present invention.

FIG. 2 is a schematic circuit diagram of an embodiment of an MMC 1, e.g. a high-voltage MMC. The MMC 1 may be used in electric power transmission systems such as STATCOM, Frequency Converters in direct or indirect topology or HVDC transmission. One or more (high-voltage) phases, u, v and w having respective currents i1, i2 and i3 are input to the converter 1 via input lines, e.g. via bushings through a wall of the room or building in which the converter 1 is located. In this example the MMC is in delta configuration with three phase legs 2, but any other configuration and number of phase legs is also possible with embodiments of the present invention. Each phase leg 2 comprises a plurality of cascaded (series connected) cells (also called cell modules) 3. The currents in the converter 1 are referred to as "i", while the voltages are referred to as "U" in the figure, in combination with arrows indicating current directions.

The cells 3 may be of any suitable type, e.g. half-bridge or full-bridge, comprising a power storing device and a plurality of semiconductor switches.

Figure 3:
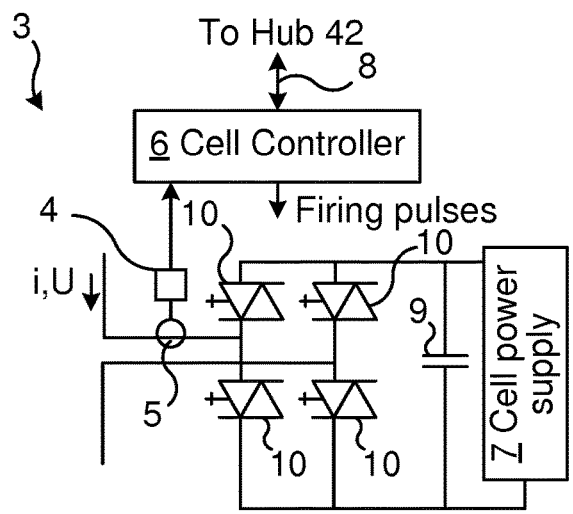
FIG. 3 is a schematic circuit diagram of an embodiment of a cell module of an MMC, with integrated sensor circuitry, in accordance with the present invention.

FIG. 3 illustrates an example embodiment of a cell 3 according to the invention. The cell comprises integrated current sensor circuitry 4 with insulation 5 at an input or output terminal of the cell, for measuring the current i through the cell, and thus through each cell of the phase leg. The sensor 4 is connected to/between a current conducting line (could also be called conductor or wire), via the insulation 5, and the cell controller 6, also comprised in the cell 3 and at a high electrical potential thus reducing the voltage/potential difference over the sensor, as discussed herein. The cell controller controls the semiconductor switches 10, e.g. diodes, IGBT, GTO, IGCT, and/or MOSFET devices, e.g. in combination with an anti-parallel diode, by means of firing pulses. In accordance with the present invention, the cell controller 6 of the cell 3 is in optical communication with a higher level controller, e.g. a phase controller or hub 42 (see also FIG. 4), over an optical communication interface (e.g. comprising an optical cable/fiber and/or laser) 8. The cell 3 further comprises a power storing device, e.g. one or more capacitor(s) 9 or inductors, and a cell power supply 7 (which may also power the sensor 4) deriving power from the power storing device 9, and any other commonly used components of a regular MMC cell.

In accordance with the present invention, not all cells 3 of a phase leg 2 comprises current sensor circuitry 4 and 5. However, in other respects cells 3 without such sensor may be as described with reference to FIG. 3.

Particularly, each and all of the cells 3 of the phase leg 2 may comprise an optical interface between its cell controller 8 and a higher level controller, e.g. hub 42. Thus, information about a current measured by a sensor 4 in a cell 3 comprising such a sensor may be signaled optically to each of the other cells 3 in the phase via the higher level controller 42, or at least to some or all of the cells 3 in the phase leg 2 which do not comprise its own sensor circuitry or who's sensor circuitry is not operational.

Figure 4:
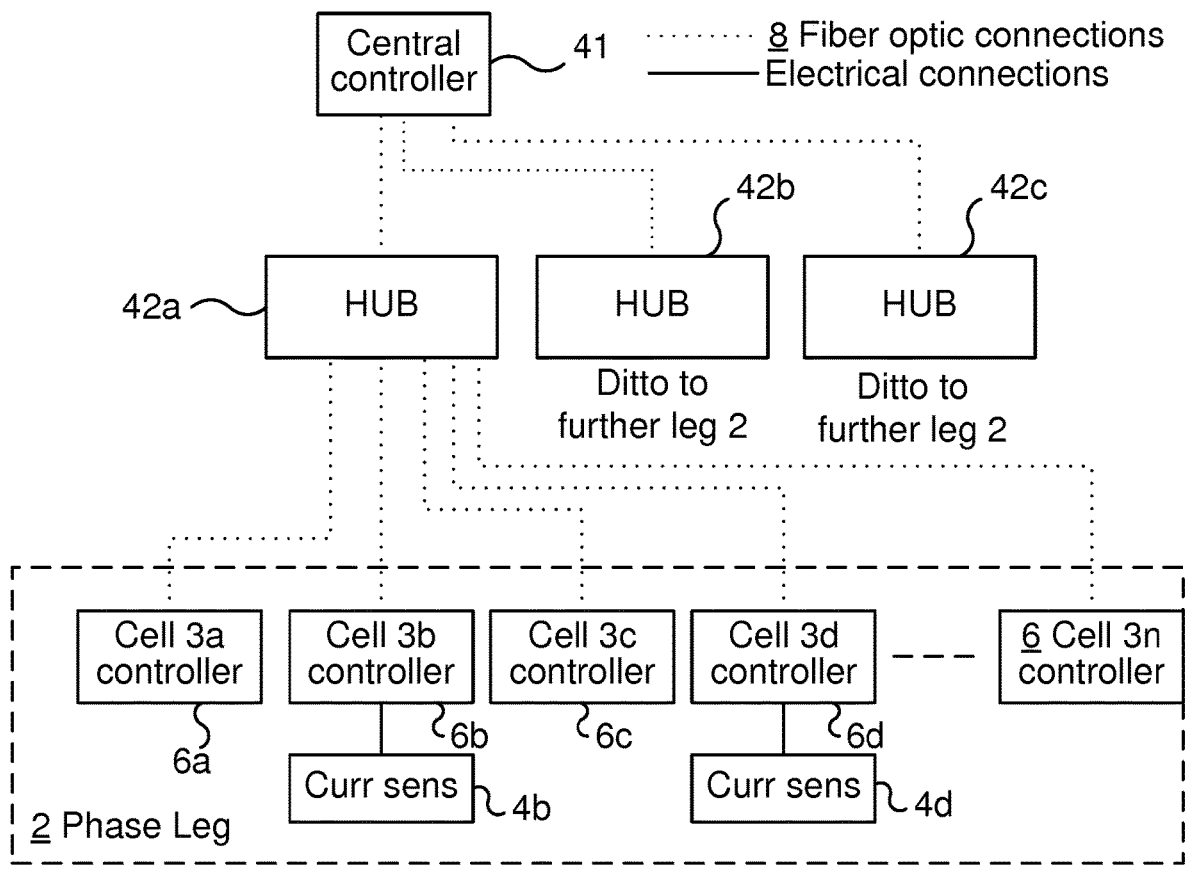
FIG. 4 is a schematic block diagram of an embodiment of a control topology of an MMC with current sensors, in accordance with the present invention.

FIG. 4 is a block diagram of an embodiment of a control topology for a converter 1. As discussed above, a phase leg comprises a plurality of cells 3, each of which comprises a cell controller 6, and one or some of the cells each comprises a current sensor 4. The phase leg may comprise any number of cells 3, here denoted 3a, 3b, 3c, 3d . . . 3n. Cell 3a comprises a cell controller 6a and no current sensor, cell 3b comprises a cell controller 6b and a current sensor 4b, cell 3c comprises a cell controller 6c and no current sensor, and cell 3d comprises a cell controller 6d and a current sensor 4d, and further to cell 3n (each cell with or without a current sensor). Each cell controller 6 has an optical interface 8 for optical communication with higher level controller(s) 42 and or 41. In the example of the figure, each phase leg 2 has a control hub 42 which is configured for optical communication with each of the cell controllers 6 of the phase leg. The respective hub 42a, 42b and 42c (and hub(s) 42 for any further phase legs 2) of each phase leg may also be configured for optical communication with an even higher level controller, here called a central controller 41, which may be the main controller of the converter 1. To simplify the figure, only one phase leg 2 is shown, but the discussion is relevant to any further phase leg(s), whose cell controllers 3 are configured for optical communication with their higher level controller, e.g. hub 42. In an alternative embodiment, e.g. if the converter comprises only one phase leg but may also be relevant for converters comprising a plurality of phase legs, there are no hubs 42 but the cell controllers 3 may be configured for optical communication directly with the central controller 41.

In accordance with the present invention, at least one, but not all cells 3 of a phase leg 2 comprises an integrated current sensor 4. The most cost effective alternative would be to only have a current sensor in one of the cells 3 of each phase leg, but for the sake of redundancy it may in other embodiments be convenient that a plurality of cells 3 of each phase leg 2 comprises an integrated current sensor 4.

The solution of the present disclosure to reduce the insulation level of the current sensor 4 is to place the current sensor integrated in the cell module as in FIG. 3. The measurement signals are sent via fast fiber optic link 8 to a central control board 41 or intermediate control hub 42 of the phase 2 that has an electrical potential equal to, or close to, ground, which means that insulation is done by means of the fiber optic cable 8 which may be easier to handle. The power supply 7 of the current transducer is derived locally from the cell 3 (Cell Power Supply 7) and the sensor signal is captured by a cell internal control board (Cell Controller 6) also comprised in the cell module 3.

This reduces the insulation level (potential/voltage difference) from several tens of kilovolts to some kilovolts (e.g. about 4 kV). For this reduced voltage level it is easier to find current sensors on the market and at a lower price. Another advantage of this approach with integrated current sensor 4 is the modularity. Current measurement will no longer depend on the different converter voltage levels and the number of cells 3 connected in series. As mentioned above, a disadvantage of including a current sensor 4 in each cell 3 is that a high number of current sensors are needed which increases the cost of the converter 1 (especially for converters with a high number of cells).

In order to reduce costs, only one or some of the cells 3 of a phase leg 2 is with a current sensor 4. In order to avoid impact on the cell redundancy (allowing cell modules 3 to be by-passed, removed or exchanged), it may be convenient to equip more than one cell 3 of each phase leg 2 with a current sensor 4. For example, if three redundant cells 3 per phase leg 2 are installed, the number of cells 3 per leg 2 with current sensor should be four.

Cells 3 without a current sensor 4 gets the current information via optical link 8 from cells with current sensors via a hub 42 or central controller 41 to which all cells of a phase leg are connected (via optical communication link 8).

In some embodiments of the present invention, the cell controller 6 receives, or is configured for receiving, information about current measurements in other cell(s) of the phase leg 2 over the optical communication interface 8. Thus, the cell controller may compare the measurements in other cells in the phase leg to determine whether they sufficiently correspond to the measurements performed by the current sensor in its own cell 3. Thus, a failure of a current sensor may be determined, or the cell controller 6 may decide to use a mean value of the current measurements of its own and other cells for controlling the semiconductor switches 10.

In some embodiments of the present invention, the current conducting line has a voltage measured to ground of at least 10 kV, e.g. between 10 and 50 kV, such as between 20 and 40 kV, or higher e.g. up to 100 kV, 200 kV or 300 kV or more.

In some embodiments of the present invention, the cell controller (6) has a voltage measured to ground of at least 10 kV, e.g. between 10 and 50 kV, such as between 20 and 40 kV, or higher e.g. up to 100 kV, 200 kV or 300 kV or more.

In some embodiments of the present invention, the difference in electrical potential between the current conducting line and the cell controller is relatively small since none are at ground potential, e.g. some kilovolts such as about or less than 10 kV or 5 kV, e.g. between 1 and 5 kV, such as between 2 and 4 kV.

In some embodiments of the present invention, the cell controller 6 is configured to, over the optical interface 8 to the higher level controller 41 or 42, send an indication that the current sensor 4 has measured a current which is above a predetermined overcurrent threshold. Thus, a warning message, e.g. in the form of a bit information "overcurrent_pulseblock" can be sent to the other cells 3 in the phase leg 2, especially cells without current sensor, e.g. allowing the other cells to block pulse firing to the semiconductor switches in view of the overcurrent.

In some embodiments of the present invention, the cell controller 6 is configured to, in response to the measured current above the overcurrent threshold, block firing pulses to the semiconductor switches 10.

The cell controller 6 may be configured for performing the method of the present disclosure by means of a computer program product comprising computer-executable components in the form of software for causing the cell controller to perform the method.

Embodiments of the present invention may be conveniently implemented in a cell controller 6 using one or more conventional general purpose or specialized digital computer, computing device, machine, or microprocessor, including one or more processors or field-programmable gate arrays (FPGA), memory and/or computer readable storage media forming a computer program product of the present invention when programmed according to the teachings of the present disclosure. Appropriate software coding can readily be prepared by skilled programmers based on the teachings of the present disclosure, as will be apparent to those skilled in the software art.

In some embodiments, the present invention relates to a computer program product which is a non-transitory storage medium or computer readable medium (media) having instructions stored thereon/in in the form of computer-executable components which can be used to program a cell controller 6 to perform the method of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A Modular Multilevel power Converter, MMC, comprising:

at least one phase leg, each phase leg comprising a plurality of series connected cells, each cell comprising:

a power storing device;
a plurality of semiconductor switches; and
a cell controller, wherein the cell controller comprises an optical communication interface and is configured for communication with a higher level controller over said optical communication interface;
at least one cell of the plurality of series connected cells further comprising a current sensor, wherein the current sensor is connected between a current conducting line in the cell and the cell controller of said cell, for measuring a current through the cell and signaling said current measurement to the cell controller, wherein the cell controller is configured to forward the current measurement to the higher level controller over said optical communication interface;
wherein the cell controller of each of the plurality of series connected cells which do not comprise a current sensor is configured to receive the current measurement from the higher level controller over its optical communication interface.

2. The MMC of claim 1, wherein the current conducting line has a voltage measured to ground of at least 10 kV.

3. The MMC of claim 1, wherein each of the cell controllers has a voltage measured to ground of at least 10 kV.

4. The MMC of claim 1, wherein a difference in electrical potential between the current conducting line and the cell controller of said at least one cell is less than 10 kV.

5. The MMC of claim 1, wherein the cell controller of the at least one cell is configured to, over the optical communication interface to the higher level controller, send an indication that the current measurement is above a predetermined overcurrent threshold.

6. The MMC of claim 5, wherein the cell controller of the at least one cell is configured to, in response to the current measurement above the predetermined overcurrent threshold, block firing pulses to the semiconductor switches.

7. A method performed in a Modular Multilevel power Converter, MMC, including at least one phase leg, each phase leg comprising a plurality of series connected cells, the method including:
in a first cell of the plurality of series connected cells, obtaining from a current sensor, connected between a current conducting line in the first cell and a cell controller in said first cell, a current measurement of the current conducting line;
forwarding the current measurement from the cell controller to a higher level controller over an optical communication interface of the cell controller;
in a second cell of the plurality of series connected cells, receiving the current measurement at a cell controller of the second cell from the higher level controller over an optical communication interface of the cell controller of the second cell.

8. The MMC of claim 2, wherein each of the cell controllers has a voltage measured to ground of at least 10 kV.

9. The MMC of claim 2, wherein a difference in electrical potential between the current conducting line and the cell controller of said at least one cell is less than 10 kV.

10. The MMC of claim 2, wherein the cell controller of the at least one cell is configured to, over the optical communication interface to the higher level controller, send an indication that the current measurement is above a predetermined overcurrent threshold.

11. The MMC of claim 1, wherein the cell controller of said at least one cell of the plurality of series connected cells is also configured to receive a current measurement in another cell of the plurality of series connected cells of the phase leg over its optical communication interface.

12. The MMC of claim 11, wherein the cell controller of said at least one cell of the plurality of series connected cells is also configured to compare the current measurement in said another cell with the current measurement in said at least one cell.

13. The MMC of claim 12, wherein the cell controller of said at least one cell of the plurality of series connected cells is also configured to determine a failure of the current sensor based on said comparison.

14. The method of claim 7, further comprising: the cell controller of the first cell receiving a current measurement in the second cell, over its optical communication interface.

15. The method of claim 14, further comprising: the cell controller of the first cell comparing the current measurement in the second cell with the current measurement in the first cell.

16. The method of claim 15, further comprising: the cell controller of the first cell determining a failure of the current sensor based on said comparison.

* * * * *